US007610387B1

(12) United States Patent
Liskov et al.

(10) Patent No.: US 7,610,387 B1
(45) Date of Patent: Oct. 27, 2009

(54) METHOD AND APPARATUS FOR PROVIDING STICKY BINDINGS USING VERSION VECTORS

(75) Inventors: Barbara Liskov, Waltham, MA (US); David M. Bornstein, Westwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 793 days.

(21) Appl. No.: 10/706,360

(22) Filed: Nov. 12, 2003

(51) Int. Cl.
*G06F 15/16* (2006.01)

(52) U.S. Cl. .................. 709/227; 709/201; 709/245; 709/242; 709/238; 370/389; 370/390; 370/466; 370/410; 340/852; 707/10

(58) Field of Classification Search .............. 709/1, 709/245, 242, 203, 224, 227, 238
See application file for complete search history.

(56) References Cited

U.S. PATENT DOCUMENTS

| 6,052,718 | A * | 4/2000 | Gifford ................. 709/219 |
| 6,785,704 | B1 * | 8/2004 | McCanne ................. 718/105 |
| 7,047,315 | B1 * | 5/2006 | Srivastava ................. 709/238 |
| 7,143,139 | B2 * | 11/2006 | Burbeck et al. ............. 709/206 |
| 7,158,985 | B1 * | 1/2007 | Liskov ..................... 707/101 |
| 2003/0101278 | A1 * | 5/2003 | Garcia-Luna-Aceves et al. . 709/240 |
| 2003/0188019 | A1 * | 10/2003 | Wesley ..................... 709/245 |
| 2004/0088347 | A1 * | 5/2004 | Yeager et al. ............... 709/202 |
| 2004/0090943 | A1 * | 5/2004 | da Costa et al. ............. 370/338 |

OTHER PUBLICATIONS

Oracle9i Advanced Replication Release 2 (9.2). Master Replication Concepts and Arechitecture. Dec. 5, 2002.*
Radoslavov, Pavlin et al. Topology-Informed Internet Replica Placement. 2001.*
Saito, Yasyshi et al. Taming Aggressive Replication in the Pangaea Wide-Area File System. USENIX Association. Winter 2002. pp. 15-30.*
Rajsbaum, Sergio. ACM SIGACT News Distributed Computing col. 8. Jul. 30, 2002.*

* cited by examiner

*Primary Examiner*—Hung T Vy
*Assistant Examiner*—Tuan-Khanh Phan

(57) ABSTRACT

In a network having a plurality of routers and also an application running at a plurality of replicas, a system for maintaining a client session between a client and a particular replica includes providing a database of bindings of client request identifiers to replicas. The system further includes a change log of changes made to the database where each entry has an event number. A version vector associated with the database and the change log holds a most recent event number for each router in the network. The system receives updates of change events made at the routers in the network and reconciles the updates with the database and current version vector. The system has data to maintain a client session between the client and the particular replica through repeated requests. Also the system and routers share data so that the client session can be maintained no matter which router handles subsequent client requests.

20 Claims, 12 Drawing Sheets

METHOD AND APPARATUS FOR PROVIDING STICKY BINDINGS USING VERSION VECTORS

BACKGROUND

In network computing, a distributed computer environment is a software technology for establishing and managing computing and data exchange under a client/server model in a system of distributed computers. A distributed computer environment is typically used in a larger network of computer systems having servers placed at different geographic locations. With the distributed computer environment, application users can access applications and data at remote servers.

In a distributed computer environment, it is often desirable to replicate an application to a number of different servers so that the application can run at several locations simultaneously. Application replication enables the distributed computer environment to support more users because the distributed computer environment has more computers available to perform the application operations. Application replication also distributes the application in the distributed computer environment so that users may interact with a copy of the application that is close by in network terms. This reduces delay and bandwidth consumption in the distributed computer environment.

Typically, when a user, through a client device, interacts with an application such as a web store for Internet shopping, the application maintains a "session state" about the user interaction. In the session state, the application records the events of the session as well as the client device identification. When the user, through the client device, next accesses the application, this next access is interpreted within the context of the saved information about the previous interactions. For example, the user may have already added items to a shopping cart. Each time the user interacts with the application, e.g. to add another item to the shopping cart, the request is interpreted relative to the shopping cart associated with that user through the client device.

When there are many copies of the application, each copy of the application has its own session state concerning the client devices that have interacted with that copy recently. If a client device accessed a first copy of the application, and then, in the next interaction, the client device accesses a second copy, the session state is effectively lost because the second copy of the application does not have any information about the session state established at the first copy of the application. For example, the second copy does not know what shopping cart was associated with the client device. It is therefore desirable for every user interaction within a session to be handled by the same copy of the application.

The code running on a client device typically locates an application in a distributed computer environment via the domain naming service (DNS). DNS is an Internet protocol and a distributed database that maps domain names, also referred to as DNS names, to IP addresses. When the client device code opens a session with the application, the client device code refers to the application via the application's DNS name. The DNS system, running in a network with the distributed computer environment, causes the DNS name to be resolved by a routing node that maps the DNS name to an IP address of a node running a copy of the application. A routing node in the DNS system, that is, a node running DNS resolution code, creates a binding between the DNS name and the IP address which the routing node stores in a database of bindings. Then the client device interacts with the application using this IP address.

Locating the application via DNS enables the distributed computer environment to support multiple copies of the application. One DNS name is generally shared by all copies of the application. The client device code, because it specifies an application by the DNS name, does not assume a particular network location for the application. The routing node, in this configuration, can then select any one application from among the many application copies, and return the IP address of the selected copy to the user.

SUMMARY OF THE INVENTION

Conventional techniques for replicating applications in a distributed computer environment suffer from a variety of deficiencies. Such deficiencies arise from the operation of the DNS system which causes failures in maintaining a session state between a client device and a particular copy of the application. Bindings of DNS names to IP addresses that enable a client device to connect with a particular application copy time out periodically, and this happens in a way that the client device code cannot control. For example, the operating system on the client device may function to periodically time out bindings. When the client device attempts to interact again with an application after the binding between the client device and the application copy times out, the DNS system re-resolves the DNS name. Ideally, the DNS system returns the same IP address to the client device as the DNS system previously returned. If the DNS name re-resolution occurs after the binding has timed out, the DNS system may not return the same IP address. The client device is then switched to a different application copy and the session state is lost.

Therefore, it is desirable for bindings from DNS names to IP addresses to be persistent, that is, "sticky". In other words, when the same requester, that is, client device, asks to resolve a DNS name for a second time within a relatively short time period after a first request (e.g., within thirty minutes), the DNS routing node should provide the same IP address to the client device as the client device was provided previously.

Sticky bindings may be implemented using conventional technology where all DNS resolutions are handled by a single routing node since that routing node can keep a record of previous bindings and produce new responses based on the stored information. The single routing node knows to return the same IP address as it did previously. Typically, however, more than one routing node in a distributed computer environment runs DNS resolution code because a single routing node is unable to provide adequate performance for a large number of DNS resolution requests. Generally, in a network with more than one routing node, client requests are not routed through particular routing nodes. It is nonetheless desirable for a routing node to return the same IP address in response to a client request as the requesting client device received previously, even when the second DNS resolution request is handled by a different routing node than the routing node that handled the first resolution. It is also desirable for DNS resolutions in a system with multiple routing nodes to be done quickly, so that the system as a whole has good performance. Further, it is desirable to replicate an application without altering the application code or client device code on client devices.

Embodiments of the present invention significantly overcome the deficiencies described above and provide methods and apparatus for providing sticky DNS bindings in a distributed computer environment having multiple routing nodes. More specifically, embodiments of the invention provide methods and apparatus for providing sticky bindings in the distributed computer environment using version vectors. In the distributed computer environment, each routing node has a "sticky" database that stores bindings of client requests to IP addresses of applications. Using this database, the routing node returns the same IP address after re-resolution of DNS names as before. The information in the database is shared among the routing nodes in the network so that the client device receives the same IP address no matter which routing node handles the client request. The sharing of database information among routing nodes is accomplished through change logs and version vectors. Each routing node, in addition to the "sticky" database, has a change log of change events in the database and a version vector to track change events to the sticky databases at each routing node. The version vector is a table having an entry for each router. Each version vector entry is a latest change event number in the sticky database in one of the routers. Each routing node periodically communicates a change group and version vector to each of the other routers. Upon receiving a change group and a version vector from another routing node, a routing node incorporates this received information into its sticky database. This enables the routing nodes to maintain substantially the same data in each sticky database and therefore enables each routing node to handle a client request the way the client request was handled previously even if the client request was handled by a different routing node.

One such method embodiment is implemented in a router, and includes the step of providing a database of bindings of request identifiers to replicas where each binding is a record having a request identifier, a replica identifier and a binding expiration time. The database is associated with the router which is a first router in a plurality of routers. The router maintains a change log of records entered into the database where each change log entry has a change event generated by the router and an event number sequential to an event number of a preceding change event in the change log. The router maintains a current version vector associated with the database and the change log. The current version vector entry for the router is a most recent event number from the change log and the current version vector entry for each other router in the network is a most recent event number received at this router from that other router. When the router receives an update of change events generated by another router in the plurality of routers in the network, the router reconciles the current version vector according to the received update. The router then reconciles the database according to the received update. The router deletes the binding from the database when the expiration time for the binding has elapsed. The router is thus able to store information about a client session and to share information about the client session so that the client session is maintained even in a network having a plurality of routers.

In one embodiment of the invention, the request identifier in the client request is a client identifier and an application identifier. In a first arrangement of the invention, the client identifier is an Internet Protocol address of the client. In a second arrangement of the invention, the client identifier is an Internet Protocol address of a dproxy. A dproxy in this case is a DNS proxy. The DNS proxy is a DNS server that acts as an intermediary between a client and other DNS servers. The dproxy accepts a client request and, if the dproxy does not have the requested data, the dproxy communicates with other DNS servers to acquire the requested data. In this second arrangement, the binding binds the dproxy with a replica rather than a client directly with a replica. These client identifiers are convenient to use as this information is already available in the network.

In another embodiment of the invention, the step of reconciling the version vector further includes comparing a least recent event number of the router that generated the update to the event number in the current version vector entry for that router. If the least recent event number is in series with the event numbers in the database as determined by the current version vector entry for that other router, then the present router, the first router, enters the most recent event number of the received update into the current version vector entry for the router that generated the update of change events. If the least recent event number in the update is not in succession to the event number in the current version vector entry for the router that generated the update of change events, then the first router discards the received update. The router is able to determine whether its database is complete through the version vector.

In another embodiment of the invention, the step of reconciling the database further includes determining whether the received entry has expired. The router discards expired entries. If the received entry has not expired, the router compares the request identifier of the received entry with the request identifier in the entries in the database. If the router does not find a match in the database, the router adds the received entry to the database. If the router does find a match in the database, the router then compares the application identifier of the received entry with the application identifier of the matching entry. If the application identifiers match, the router then retains the entry having a later expiration time in the database. If the application identifiers do not match, the router then retains an entry selected based on a deterministic function applied to a portion of each entry. The router is able to take bindings made at other routers in the network and include those bindings in its own database in order to maintain client session established by other routers.

In an alternative embodiment of the invention, the step of retaining an entry based on a deterministic function further includes the steps of applying a function to the application identifiers; and selecting an entry based on the outcome of the function. In another alternative embodiment of the invention, the step of retaining an entry based on a deterministic function further includes the steps of applying the deterministic function to the request identifier and selecting an entry based on the outcome of the deterministic function.

In another alternative embodiment of the invention, the router sends a request for an update of change events to another router in the plurality of routers in the network. The step of receiving the update further includes, the step of the router receiving the update in response to the request. The router, in order to ensure that its database is complete, may request database updates from other routers in the network to which these other routers in turn respond.

In another alternative embodiment of the invention, the router periodically generates an update of change events and transmits the update of change events to at least one other router in the plurality of routers in the network. The router, in order to maintain the client sessions it has established, sends an update to the other routers in the network.

In another embodiment of the invention, the router affirms that an update has been received from each other router within a predetermined period for that router. If an update has not been received from a particular router, then the present router requests an update of change events from the other router, then the present router requests an update of change events from the other router. If an update is received, the present router reconciles the current version vector and the database according to the received update. The present router further transmits a copy of its database and its current version vector to another of the routers in the plurality of routers in response to a request from the other router. In this embodiment of the invention, the router maintains a watch on the other routers in the network. If an update has not been received from another router within a preselected period of time, the router requests an update in order to maintain a complete database.

In another embodiment of the invention, the router maintains a version vector table including past version vectors. In an alternative arrangement, the router determines from a received update whether the database is current based on the version vector table and if the database is not current, the router then requests missed change events from the router that generated the received update. In another arrangement, each router in the network caches updates received from the other routers in the plurality of routers in the network. If the present router does not receive an update in response to a request for an update, the present router requests missed change events from a second other router in the plurality of routers. In this embodiment, the router is able to determine from the version vector table that it has missed updates. The router then requests an update from another router in the network. This is particularly useful where network configuration prevents routers from communicating directly with each other. The router missing the information can request an update from another router in the network with whom it can communicate directly.

In another embodiment of the invention, the router fails and then recovers its database. In this embodiment, the router writes its change log to a persistent storage device. After recovering from failure, the router requests a database and an associated version vector from one of the other routers in the plurality. The router retains the received database and associated version vector. The router reconciles the received database with the change log from the persistent storage device and updates the version vector. This failure recovery process enables the router to recover from failure easily using a common storage device.

In another embodiment of the invention, the router fails and recovers its database using epoch time stamps. The router creates an epoch timestamp from a clock of the computerized device to mark a recovery period and enters a value pair to the current version vector for the first router, the value pair being an event number and the epoch timestamp. The router then, after recovery, requests a database copy and associated version vector from one of the other routers in the plurality and recovers using the epoch time stamp and the received data. This method of enables the router to recover from failure without a persistent storage device

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

Embodiments of the invention include a distributed computing environment having multiple routing nodes in which client sessions are maintained because bindings of DNS names to application copies are persistent. That is, successive client requests for an application receive a same application copy in response even if different routers in the environments handle the client requests. Each routing node has a "sticky" database that stores bindings of client requests to IP addresses of applications. With this database, a client receives a same IP address associated with an application copy in response to repeated requests for an application. The information in the database is shared among the routing nodes in the network so that the client device receives the same IP address no matter which routing node in the network handles the client request. The sharing of database information among routing nodes is accomplished through change logs and version vectors. Each routing node, in addition to the "sticky" database, has a change log of change events in the database and a version vector to track change events at the sticky databases at each routing node. The version vector is a table having an entry for each router. Each version vector entry is a latest change event number in the sticky database in one of the routers. Each routing node periodically communicates a change group and version vector to each of the other routers. Upon receiving a change group and a version vector from another routing node, a routing node incorporates this received information into its sticky database. This enables the routing nodes to maintain substantially the same data in each sticky database and therefore enables each routing node to handle a client request the way the client request was handled previously even if the client request is handled by a different routing node.

Figure 1:
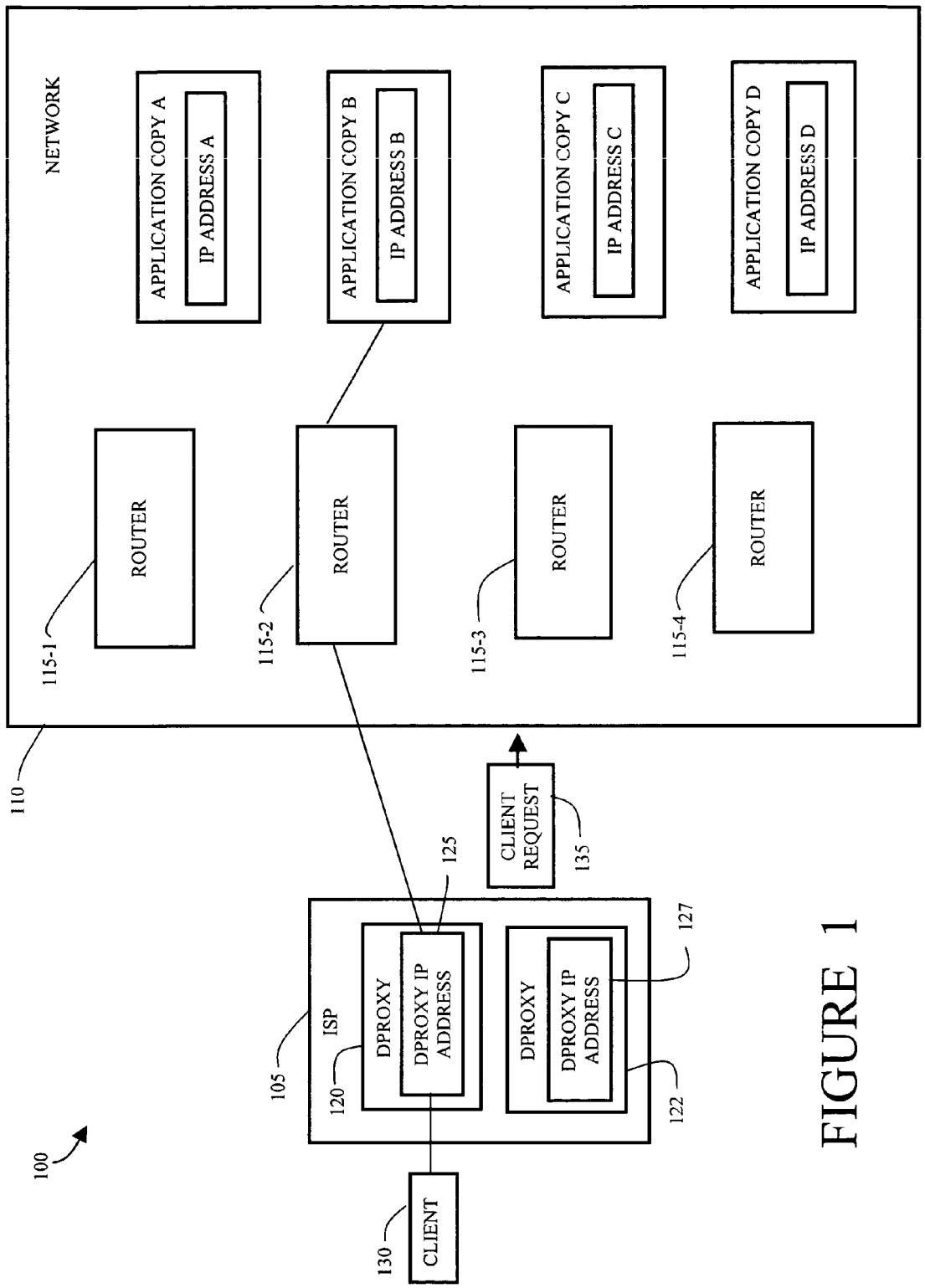
FIG. 1 is a block diagram of a distributed computing environment including a routing node according to the principles of the present invention.

FIG. 1 is a block diagram of a distributed computer environment 100 including an Internet service provider (ISP) 105, also referred to as a "gateway", connected to a network 110 such as the Internet. A client 130 is connected to the ISP 105. The network 110 has a plurality of routing nodes, also referred to as routers 115-1, 115-2, 115-3, 115-4 (generically referred to as the router 115), configured according to principles of the present invention. The router 115 is described in greater detail below in association with FIG. 2. The network 110 also has a plurality of copies of an application, application copy A, application copy B, application copy C, and application copy D. The conies of the application are also referred to as "replicas." Each application copy provides the functionality of every other copy. Each application copy has its own IP address. Accordingly, application copy A has IP address A, application copy B has IP address B, application copy C has IP address C and application copy D has IP address D.

The ISP 105 has a plurality of dproxies 120, 122 where each dproxy 120, 122 has its own dproxy IP address 125, 127. The dproxies 120, 122 are caching name servers typically used in systems, such as the ISP 105, acting as gateways to networks. The dproxies 120, 122 cache DNS look-ups from the client 130. The dproxies respond to requests in order to increase response time for future DNS lookups.

The client 130 makes a connection to the network 110 through the ISP 105. In this example, the client 130 makes a connection to application copy B through the dproxy 120 and then through one of the routers 115. In operation, the client 130, connected to the ISP 105, sends a client request 135 to access the application using the application's domain name, for example, www.application.com. The ISP 105 receives the client request 135 and gives it to the dproxy 120 to request a connection. The dproxy 120 selects a network router 115. In the network 110, a selected router 115 responds to the client request 135 with the IP address of one of the copies of the application, for example, IP address B, so that the client 130 may establish a connection with application copy B.

The router 115 stores a copy of the binding between the dproxy 120 and the application copy, application copy B. Periodically, however, the bindings are timed out under the operation of the router operating system. Bindings are discussed in more detail below and are illustrated in the sticky database in FIG. 3. The present invention enables users to extend the duration of the bindings so the client sessions between clients and copies of application can be maintained. In this example, the router 115 will operate to preserve the binding between the client 130 and application copy B. Accordingly, the router 115 will provide IP address B for application copy B in response to a second client request from client B for the application. In this way, the present invention operates to maintain client sessions between clients and particular copies of the replicated application.

Figure 2:
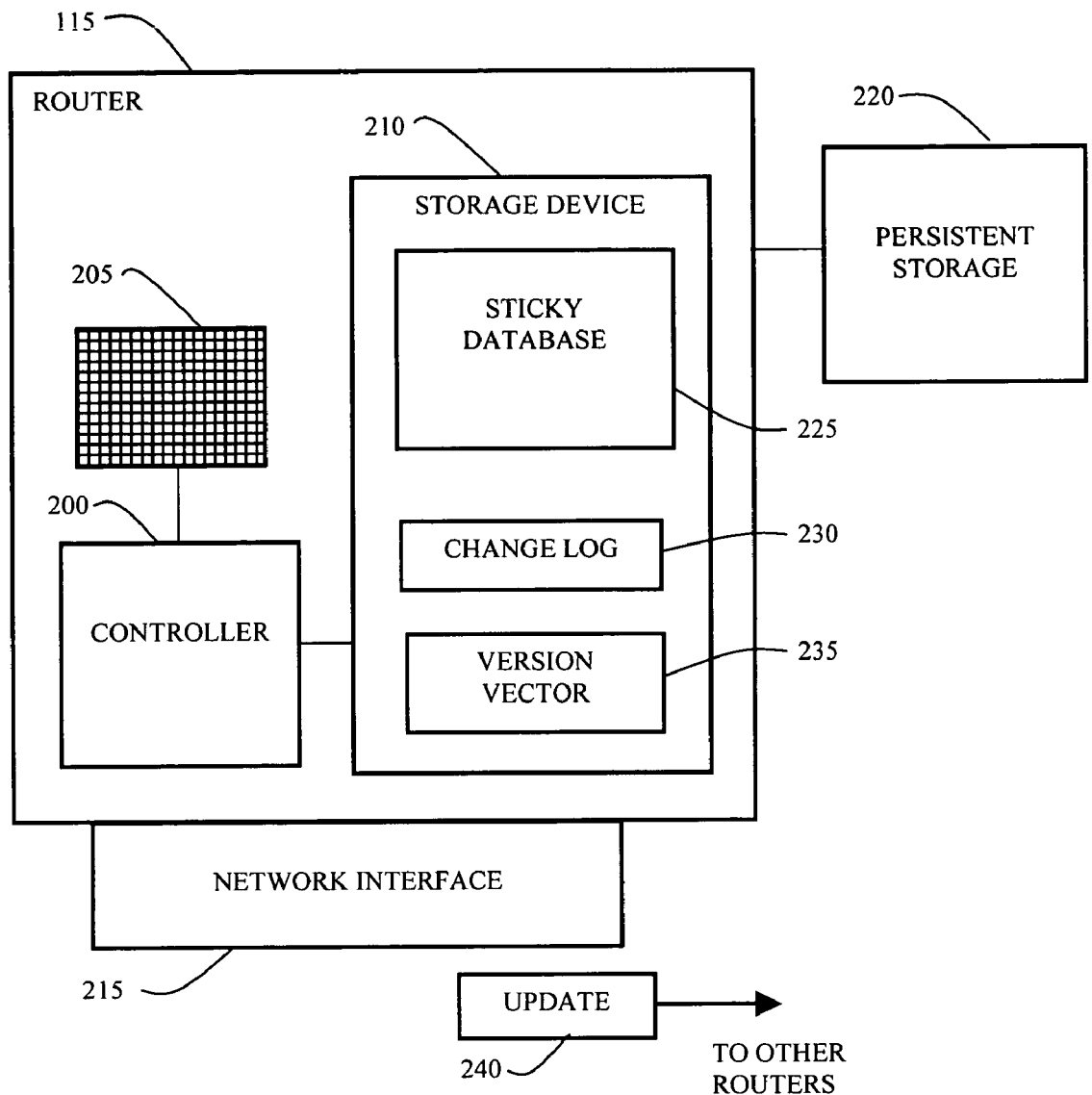
FIG. 2 is a block diagram of the routing node of FIG. 1.

FIG. 2 is a block diagram of the router 115 of FIG. 1. The router 115 has a controller 200 connected to a memory 205 and a storage device 210. The router 115 has a network interface 215 through which the router 115 connects to the network 110 shown in FIG. 1. The storage device 210 has a sticky database 225, a change log 230 and a version vector 235. The sticky database 225 stores bindings between a client and an application identifier (e.g., a URL) to an application copy, for example from the dproxy 120 and www.cdn-appl.com to application copy B. The change log 230 is a list of changes made to the sticky database 225 where each change is recorded as a change event associated with an event number. The version vector 235 is a table having an entry for each router. Each version vector entry is a latest change event number in the sticky database 225 in one of the routers. In an alternative embodiment of the invention, the router 115 also has a persistent storage device 220. The persistent storage device 220 may be external as shown in FIG. 2 or the persistent storage device 220 may be located inside the router 115 itself.

In operation, the controller 200 in conjunction with the memory 205 controls the router 115. When the router 115 receives the client request, the router 115 determines what application the client is requesting. In this example embodiment, the client request 135 comes from one of the dproxies, for example, dproxy 120. The router 115 searches its sticky database 225 for a binding matching the client request 135, that is, a request from the dproxy 120 for the application. If the router 115 finds a matching binding, the router 115 returns to the dproxy 120 the IP address from the matching binding. The IP address is that belonging to the application copy that the dproxy 120 accessed earlier. In addition, the router 115 extends the expiration time of the matching binding. If the router 115 does not find a matching binding in the sticky database 225, the router 115 selects an application copy. The router 115 typically selects a particular application copy based on information about the proximity of the client to application copies. The router 115 determines the IP address of the selected application copy. The router 115 creates a binding of the dproxy 120 and the IP address of the selected application copy, for example, application copy B, and stores the binding in the sticky database 225. The router 115 then records the event in the change log 230 along with an event number. The router 115 then replaces the event number stored in the version vector 235 with the new event number.

Periodically, the router 115 sends an update 240 over the network 110 to the other routers in the network 110. In one embodiment, the update 240 includes all changes made in the sticky database 225 since the previous update sent by the router 115. In another embodiment of the invention, the router 115 sends an update 240 in response to a request from another router. In this update 240, the router 115 includes the changes requested by the other router.

Figures 3, 5:
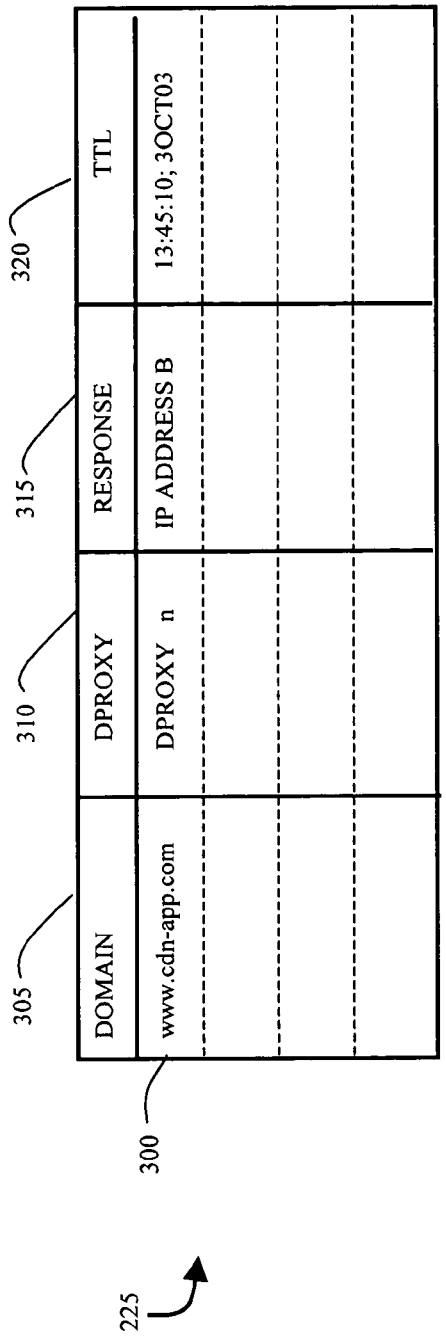
FIG. 3 is a block diagram of records in a sticky database in the routing node of FIG. 2.
FIG. 5 is a block diagram of a version vector in the routing node of FIG. 2.

FIG. 3 is a diagram of the sticky database 225. The sticky database 225 is a table of records where each record is a binding 300. Each binding 300 has an application identifier 305, a client identifier 310, an application copy identifier 315 and an expiration time 320. The application identifier 305 is, in the present example embodiment of the invention, a domain name such as www.cdn-app.com. Generally, a network runs many applications. The copies of an application in the network 105 typically share a single domain name which is used in the client request 135 to identify a requested application. The client identifier 310, in the present example embodiment, is a dproxy identifier, such as the dproxy IP address 120. The application copy identifier 315 that the client receives in response to the client request 135 is, in this example embodiment, the IP address of the application copy selected by the router 115 in response to the client request 135. The application identifier 305 and the client identifier 310 together make a request identifier used by the router to determine which application copy to provide in response to the client request 135. The router 115 sets an expiration time for each binding 300 at the time of creating the binding 300. The expiration time 320 is also referred to as a time to live (TTL). A typical TTL duration is 30 minutes. When the router 115 adds a binding 300 to the database 225, or when the life of a binding is extended, the TTL is the time of TTL duration added to the time of the router's clock. When the time of the router's clock exceeds the TTL in a binding 300, the router 115 removes the binding 300 from the database 225.

Figure 4:
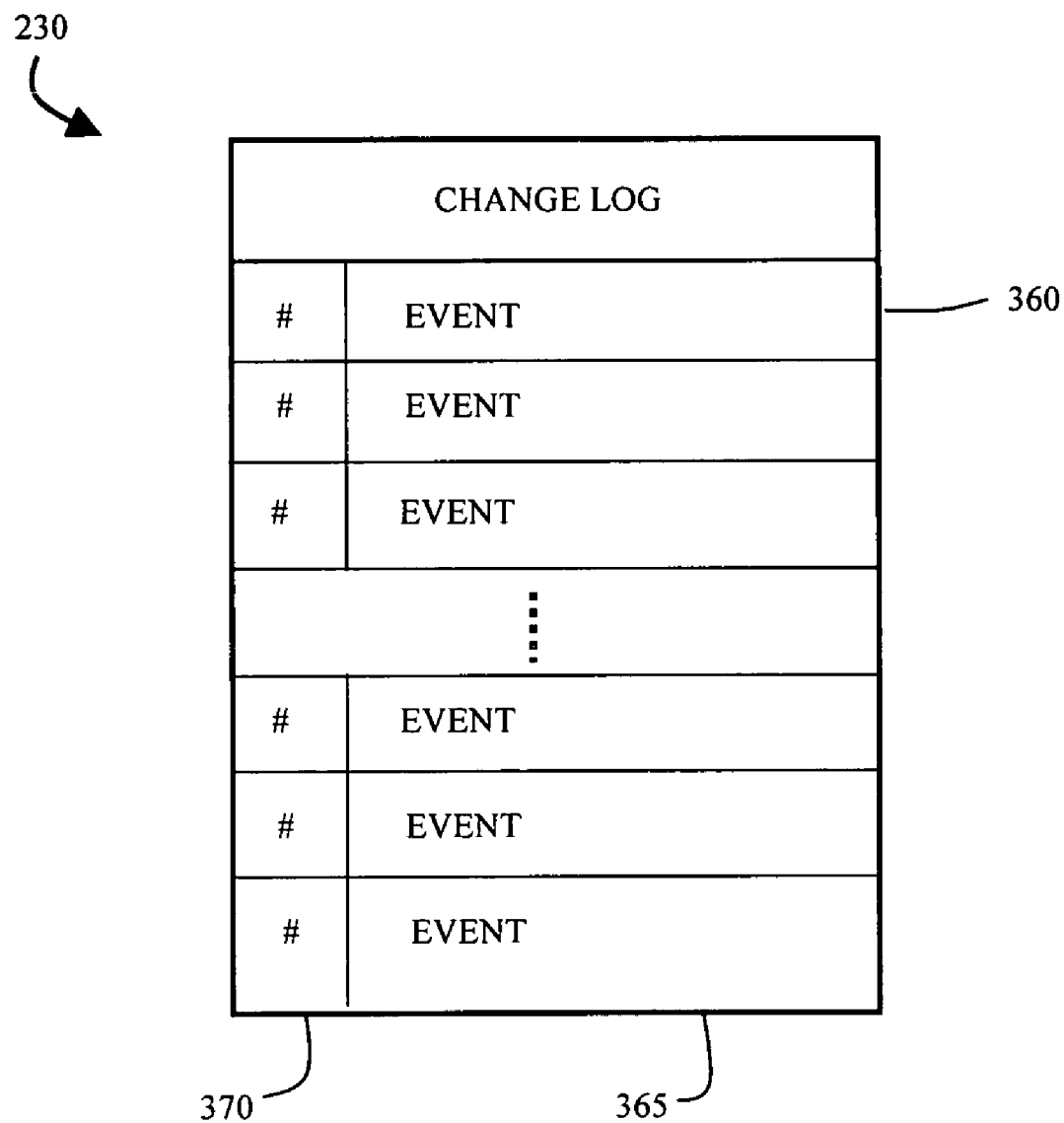
FIG. 4 is a block diagram of a change log in the routing node of FIG. 2.

FIG. 4 is a block diagram of the change log 230. The change log 230 is a list of changes 360 that the router 115 makes to the sticky database 225 where each change 300 is recorded as a change event 365 associated with an event number 370. A change event 365 is typically the addition of a new binding 300 to the sticky database 225. Each change event 365 is a binding, and accordingly, typically has the same structure as the bindings 300 in the sticky database 225 shown in FIG. 3. The changes recorded in the change log 230 are only those bindings made by the router 115 that owns the change log 230. As will be described below, the bindings made by other routers in the network 110 are added to the sticky database 225, but not included in the change log 230. The event numbers 370 in the change log 230 are in sequential order making it possible for the router 115 to make a change group of a subset of the changes by starting at a particular event number, for example, all change events occurring after a number n. The router 115 sends the change groups derived from the change log 230 as the update 240 of changes to the sticky database 225 to the other routers in the network 110.

In order to keep the change log 230 from growing overly large, the change log 230 is truncated from time to time. In a first embodiment, the router 115 truncates the change log 230 after the router 115 confirms that all other routers in the system have the changes. For example, router A communicates to router B the latest change event that router A knows about router B. Router B then confirms with the rest of the routers in the system that changes up to the latest change event known by router A are also known by the rest of the routers. Router B then deletes those changes from the change log. This method is less effective if one of the routers in the system fails. In a second embodiment, each router in the system has a maximum size threshold for its change log. When the maximum size threshold is exceeded, the router removes the oldest change. In a third embodiment of the invention, the methods of the first and the second embodiments of change log truncation are combined. In the third embodiment then, the routers 115 truncate both changes that are known to all other routers and truncate when the change log reaches the maximum size threshold. In this embodiment, there is a chance that a router may not have all of the changes for which it is asked. In this case, the router sends its entire database.

FIG. 5 is a diagram of an example version vector 235. The version vector 235 is a table with an entry for each router 115 in the network 110. In this example, there are four routers 115-1, 115-2, 115-3, 115-4, and accordingly, the version vector 235 has four entries. Each router 115-1, 115-2, 115-3 and 115-4 has its own version vector 235. The version vector 235 in each router 115 holds the most recent change event numbers known to that router. For example, if the version vector 235 in FIG. 2 belongs to router 115-2, the version vector 235 indicates that the most recent change event number at the router 115-2 is 12 and that as far as the router 115-2 knows, the most recent change event numbers at routers 115-1, 115-3 and 115-4 are 8, 16 and 4 respectively. If the router 115-2 receives an update from, for example, router 115-1 and the change events listed in the update from router 115-1 start at the number 9, then the router 115-2 knows that no changes from the router 115-1 have been missed. The router 115-2 then reconciles the received update with its sticky database and updates its version vector. If change events listed in the update from the router 115-1 start at the number 11, for example, then the router 115-2 knows that changes to the sticky database in the router 115-1 have been missed. The router 115-2 then takes steps to correct the problem as will be described below.

Figure 6:
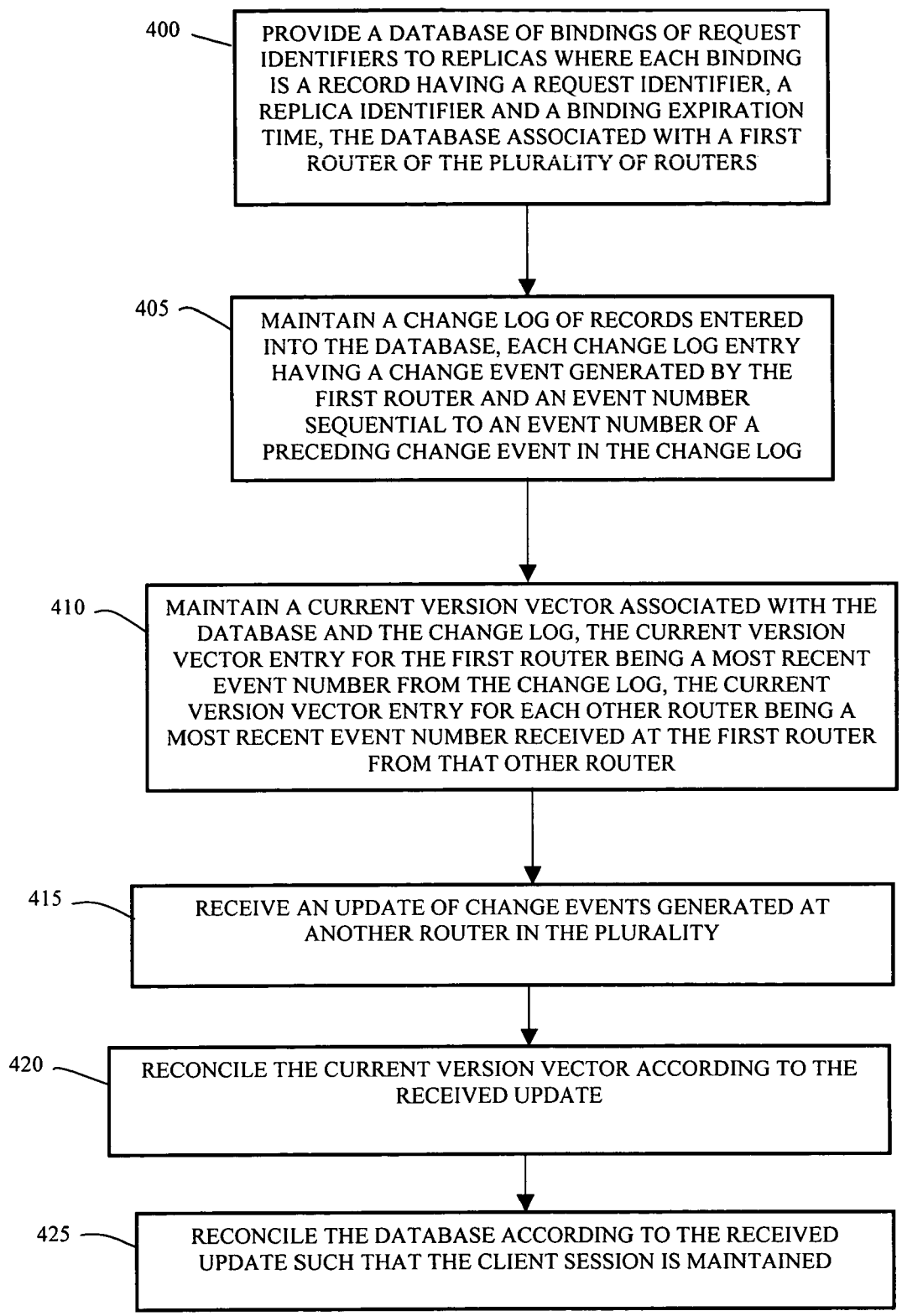
FIG. 6 is a flow chart of the process of a router of FIG. 1 in maintaining a client session according to principles of the invention.

FIG. 6 is a flow chart of the process of the router, for example, router 115-2 in maintaining a client session according to principles of the present invention.

At step 400, the router 115-2 provides the sticky database 225. The sticky database 225 is the database of bindings of request identifiers to replicas where each binding 300 is a record having a request identifier 305, 310, a replica identifier 315 and a binding expiration time 320. Each router 115-1, 115-2, 115-3, 115-4 in the network 110 has its own database 225 of bindings of request identifiers to replicas. The request identifier 315 typically includes a client identifier. In the example provided above, the client identifier is an identifier of a dproxy 120, 122 where the identifier of the dproxy 120, 122 is its IP address 125, 127. The replica identifier in the example embodiment above is the IP address of the application copy.

At step 405, the router 115-2 maintains a change log 230 of records entered into the database 225. The change log 230 is a list of changes 360 made to the sticky database 225. Each change log entry has a change event generated by the router 115-2 and an event number sequential to an event number of a preceding change event in the change log 230. A change event 365 is typically the addition of a new binding 300 to the sticky database 225. The event numbers 370 are in sequential order making it possible for the router 115-2 to make a change group of a subset of the changes by starting at a particular event number, for example, all change events occurring after a number n.

At step 410, the router 115-2 maintains a current version vector 235 associated with the database 225 and with the change log 230, where the current version vector entry for the router 115-2 stores a most recent event number received at the router 115-2 from each other router 115-1, 115-3, 115-4 in the network 110. The version vector 235 is a table with an entry for each router 115 in the network 110. Each router 115 in the network 110 has its own version vector 235. The version vector 235 in each router 115 holds the most recent change event numbers known to that router.

At step 415, the router 115-2 receives an update of change events generated at another router 115-1, 115-3, 115-4 in the plurality of routers in the network. The update 240 contains a change group generated by one of the other routers in the network 110. The change group is a set of changes made to the sticky database 225. The update 240 includes the event numbers associated with the changes. In one embodiment of the invention, the router 115-2 periodically receives updates 240 generated by other routers in the network 110. The router 115-2, too, periodically generates updates 240 to send to the other routers 115-1, 115-3, 115-4 in the network 110. In another arrangement, the router 115-2 requests an update 240 from another router in the network if no update 240 is received from that other router after a predetermined period. In another embodiment of the invention, the router 115-2 periodically requests updates from the other routers in the network 110. When the router 115-2 requests updates, the router 115-2 asks for changes starting sequentially from the events stored in the version vector.

The routers 115 in the network 110 use the update 240 to share binding information so that all the routers share knowledge of existing bindings. This enables the routers 115 to maintain substantially the same information in their sticky databases 225. Accordingly, the routers 115 are able to maintain client sessions in a network with multiple routers. In an alternate embodiment of the invention, the update 240 further includes the version vector 235 of the router that generated the update 240.

At step 420, the router 115-2 reconciles the current version vector according to the received update. The router 115-2 in a first embodiment receives only the changes and associated event numbers from one of the other routers 115-1, 115-3, 115-4 in the network 110. In this embodiment, the router 115-2 updates the entry for the other router with the most recent change event number provided in the update after verifying that the numbers are sequential with the number that is already stored in the version vector 235. For example, if the entry for the other router, for example router 115-1, is 8 and the other router 115-1 sent events 9-11 in the update, the router 115-2 updates the version vector entry with the number 11. If the other router 115-1 instead sent events 10-15, the present router 115-2 would determine that it had missed an update 240. In that case, the present router 115-2 discards the update 240 received from the other router 115-1 and requests an update or a copy of the entire database 225 from the other router 115-1. The router 115-2 in a second embodiment, receives the version vector of the other router 115-1 as well as the changes to the database 225.

At step 425, the router 115-2 reconciles the database 225 according to the received update 240 such that the client session is maintained. The router 115-2 after verifying the change event numbers in the update 240 as described above, includes the bindings of the update 240 into the sticky database 225 as will be explained below.

Figure 7:
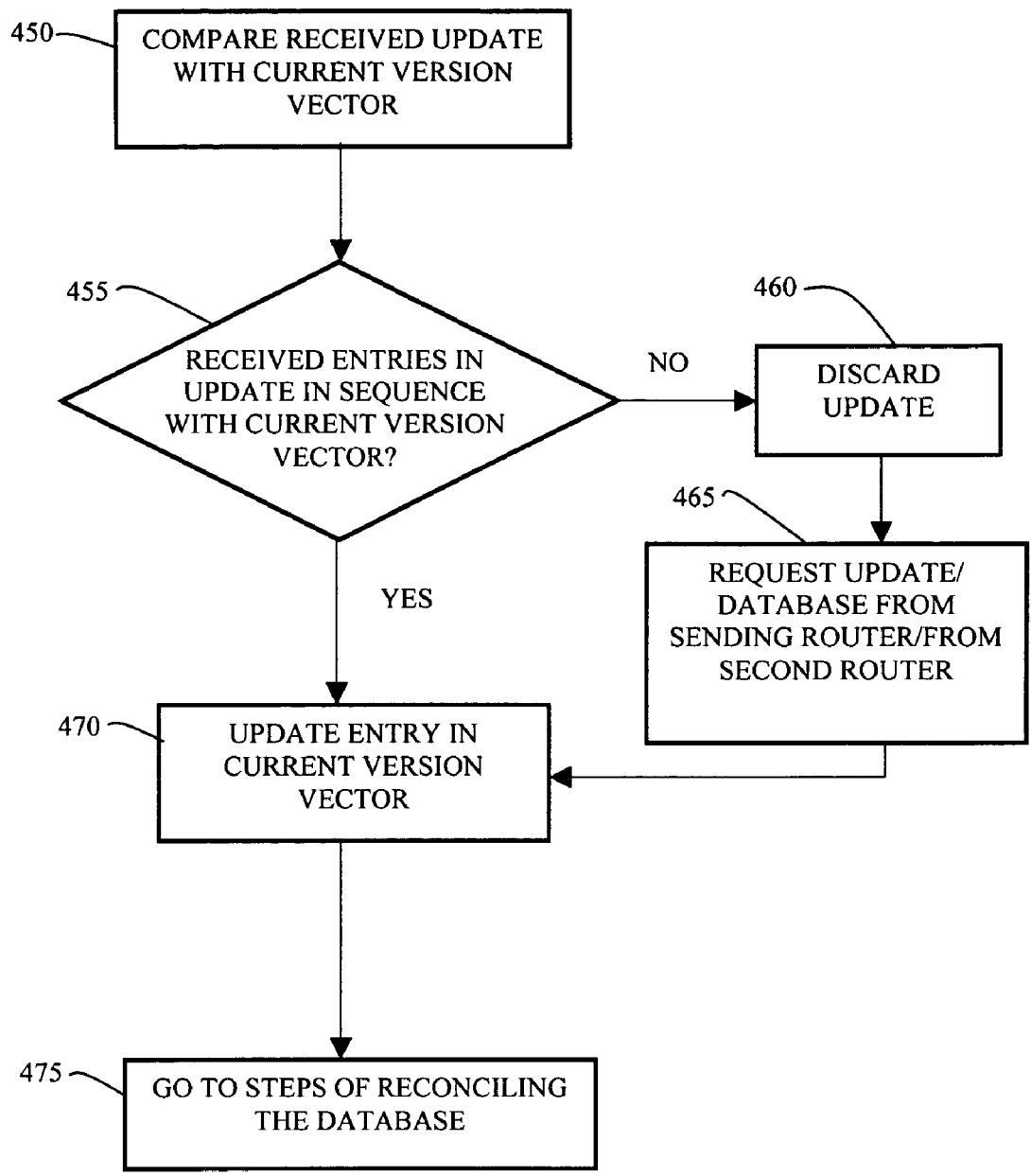
FIG. 7 is a flow chart of the process of reconciling a version vector in the router of FIG. 6 with a received update from another router in the network.

FIG. 7 is a flow chart of the process of reconciling the current version vector 235 with the received update 240 from step 420 in FIG. 6.

At step 450, the router 115-2 compares the received update 240 with the current version vector 235.

At step 455, the router 115-2 determines whether the received entries in the update 240 are in sequence with the current version vector 235. Each entry in the update 240 has an associated event number. Each router 115 in the network 110 has its own sequence of event numbers and its own version vector. The version vectors each have an entry for every router in the network. The data in each entry, in this embodiment of the invention, is the most recent event number for the entry router. The version vector, however, only has data as the data is known to the router owning the version vector. Accordingly, if the received entries in the update 240 are not in sequence with the current version vector 235, the router 115 proceeds to step 460. If the received entries in the update 240 are in sequence with the current version vector 235, the router 115 proceeds to step 470.

At step 460, the router 115-2 discards the update 240 because the entries in the update 240 are not in sequence with the current version vector 235. This indicates to the router 115-2 that it has not received all of the changes from the router that sent the update.

At step 465, the router 115-2 takes a step to bring its database up to date. In one embodiment of the invention, the router 115-2 requests a new update 240 from the other router. The new update 240 would include changes from the most recent event number in the current version vector 235 for the sending router. In another embodiment of the invention, the router 115-2 requests a copy of the database from the other router. In a further alternative embodiment, if the router 115-2 does not receive a response from the other router for either an update or a copy of the database, the router 115-2 requests an update or a database copy from a second other router in the network 110. When the router 115-2 receives the data it requested, the router 115-2 proceeds to step 470 to update the current version vector 235 and reconcile with database 225 with the received data. The router 115-2 reconciles the received database with the current database by treating the received database as a list of changes.

At step 470, the router 115-2 updates the current version vector 235. The router 115-2 replaces the data in the entry belonging to the router that sent the data with a more recent change event number.

Figure 9:
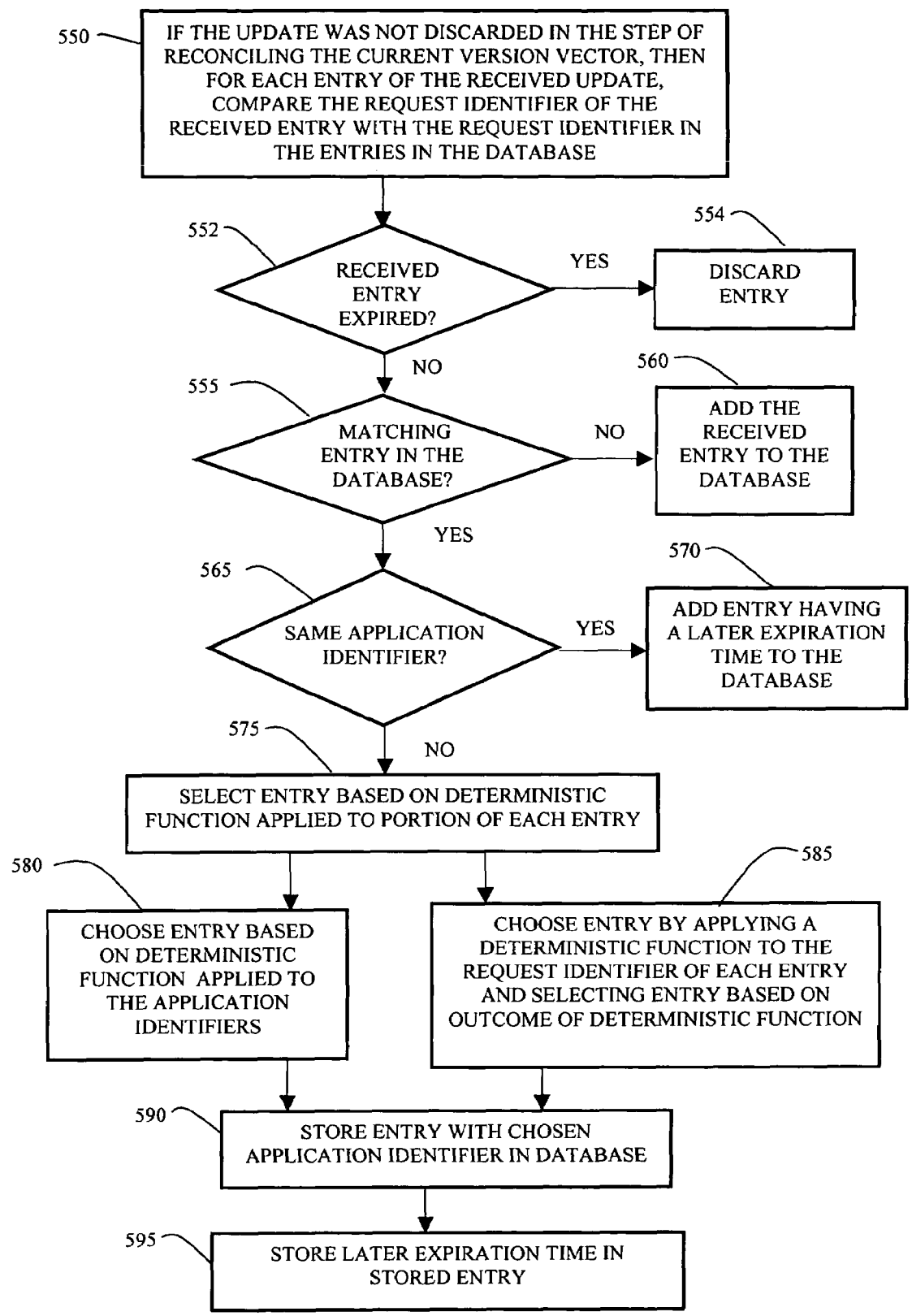
FIG. 9 is a flow chart of the process of reconciling the database of the router of FIG. 6 with the update.

At step 475, the router 115-2 proceeds to the process of reconciling the database 225 which is described in more detail in FIG. 9.

Figure 8:
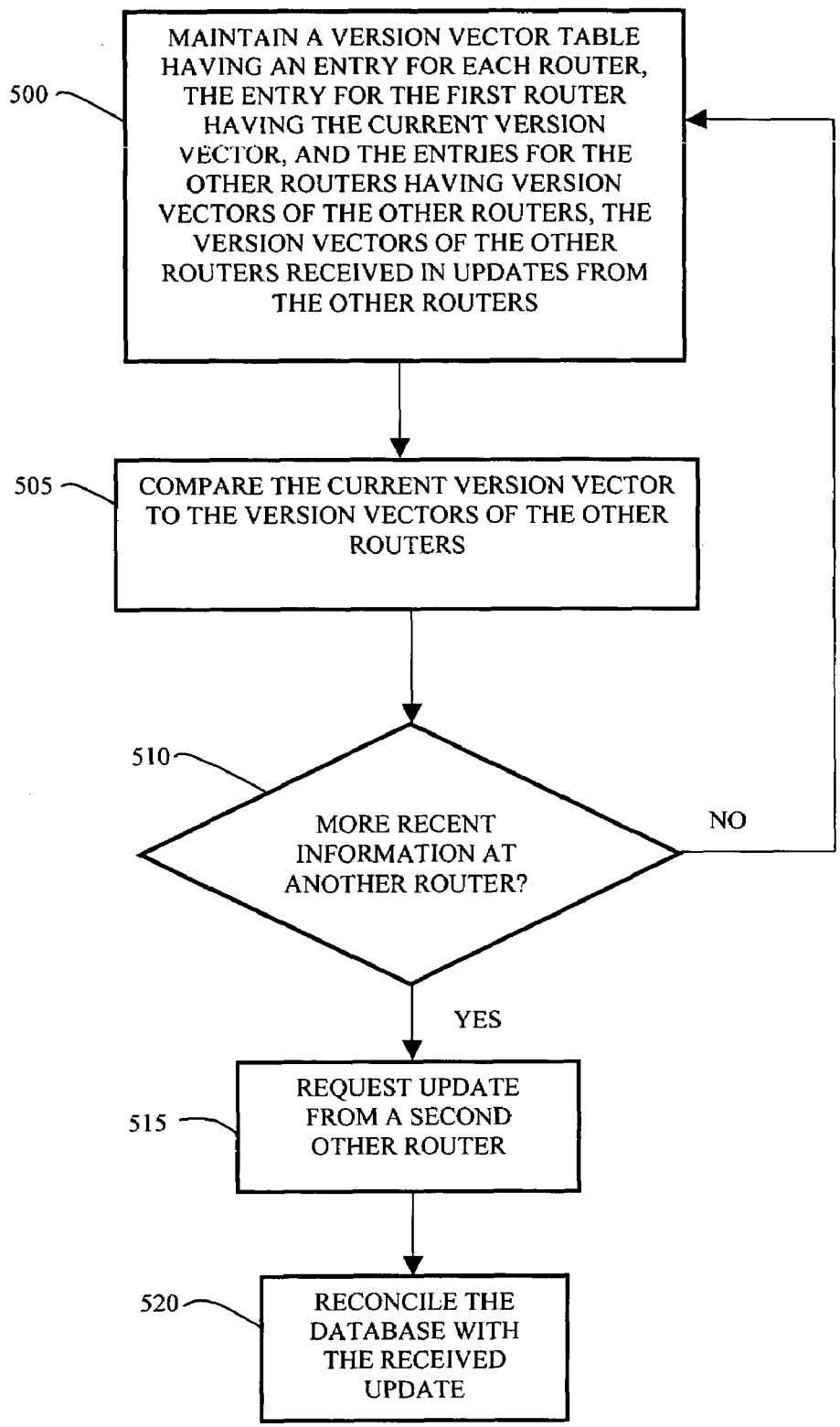
FIG. 8 is a flow chart of the alternative process of reconciling a version vector in the router of FIG. 6 with a received update in a system where the router maintains a version vector table.

FIG. 8 is a flow chart of the process in the router 115-2 of reconciling an update with the current version vector in a system where the router maintains a version vector table. The version vector table enables the router 115-2 to compare its version vector 235 with those of the other routers 115-1, 115-3, 115-4 in the network 110.

At step 500, the router 115-2 maintains a version vector table having an entry for each router 115 in the network. The entry for the router 115-2 maintaining the version vector table has the current version vector 235. The entries for the other routers 115-1, 115-3, 115-4 have copies of the version vectors maintained by those other routers. The version vectors of the other routers 115-1 are received from those other routers as part of updates from those routers.

At step 505, the router 115-2 compares the current version vector 235 to the version vectors of the other routers.

At step 510, the router 115-2 determines from the comparison of version vectors whether one of the other routers 115-1, 115-3, 115-4 has more recent information. If none of the other routers has more recent information, the router 115-2 returns to step 500. If one of the other routers has more recent information, the router 115-2 proceeds to step 515.

At step 515, the router 115-2 requests an update 240 from another router other than the one that has more recent information. One of the reasons that the router 115-2 may not complete information is that the router 115-2 may not be able to communicate directly with all the other routers in the network. For example, a firewall may be in the way. In these cases, routers are not able to communicate all of their database changes to all of the other routers. Therefore, when the router 115-2 finds that another of the routers 115-1, 115-3, 115-4 in the network have more recent information, it is probable that other router is unable to communicate with the router 115-2. Accordingly, the router 115-2 asks a second other router in the network 110 for an update 240. This step is possible where each router 115 has a change log table described below in relation to FIG. 10. After receiving the update 240, the router 115-2 proceeds to step 520.

At step 520, the router 115-2 proceeds to the process of reconciling the database 225 described in more detail in FIG. 9.

FIG. 9 is a flow chart of the process of reconciling the database 225 in the router 115-2 according to the received update 240.

At step 550, if the update 240 was not discarded in the step of reconciling the current version vector at step 460 of FIG. 7, then for each entry of the received update 240, the router 115-2 determines whether the entry should be retained or discarded.

At step 552, the router 115-2 determines whether the received entry is expired. Expired entries are received when, for example, data moves slowly in the network. Expired entries may also be received when an entry close to its expiration time is sent in an update. By the time the update reaches another node, the entry may have expired. If the router 115-2 determines that the received entry has expired, the router 115-2 proceeds to step 554 where the router 115-2 discards the entry. If the entry is not expired, the router 115-2 proceeds to step 555.

At step 555, the router 115-2 determines whether there is a matching entry in the database 225. If there is no matching entry, the router 115-2 proceeds to step 560. If there is a matching entry in the database 225, the router 115-2 proceeds to step 565.

At step 560, the router 115-2 adds the received entry to the database 225 because the entry is new and not expired.

At step 565, the router 115-2 has found an entry in the database having a request identifier matching the request identifier of an entry in the received update, and is determining which entry to keep. The router 115-2 compares the application identifiers of the database entry and the update entry. If the entries have matching application identifiers, the router 115-2 proceeds to step 570. If the entries do not have matching application identifiers, the router 115-2 proceeds to step 575.

At step 570, the router 115-2 stores the entry having a later expiration time to the database.

At step 575, the router 115-2 selects which of the entries to store in the database. This determination is made by applying a function to the database entry and to the update entry. Many different functions are possible within the scope of the invention. It is, however, important that the routers 115 agree upon the function in order to maintain consistency among the routers 115. It is also important that the function outcome be consistent among the routers 115. In other words, each router provides the same answer given the same set of inputs.

At step 580, the router 115-2 selects an entry to store in the database by applying a function to the application identifiers in the entries. An example of a function is selecting the larger or smaller of the application identifiers to store in the database.

Alternatively, at step 585, the router 115-2 determines which entry to store by applying a function to the request identifiers of the entries. For example, the router 115-2 applies a Boolean function to the request identifiers. The Boolean function maps the request identifiers to either true or false. The router 115-2 then selects one of the application identifiers of the entries based on the outcome of the function. For example, the router 115-2 selects the larger application identifier if the Boolean result was true; otherwise, the router 115-2 selects the smaller application identifiers. The router 115-2, for example, makes a hash of each of the replica identifiers in the received entry and the matching entry from the database. The router 115-2 then retains an entry based on the parity of the hashes. Alternatively, the router 115-2 hashes each replica identifier to a plurality of numbers and retains one of the entries based on the relative values of the hashes. The alternative embodiment of entry selection can provide better load balancing than the method of step 580. The reason is that many requests having different request identifiers may be requests for the same application. These requests, for example, may have different client identifiers but the same URL. In this embodiment of the invention, the clients would be distributed among the application replicas with more uniformity.

At step 590, after the router 115-2 has selected an entry, the router 115-2 stores the application identifier of the selected entry into the existing database entry.

At step 595, the router 115-2 updates the TTL of the database entry by storing the later expiration time in the database entry.

Figure 10:
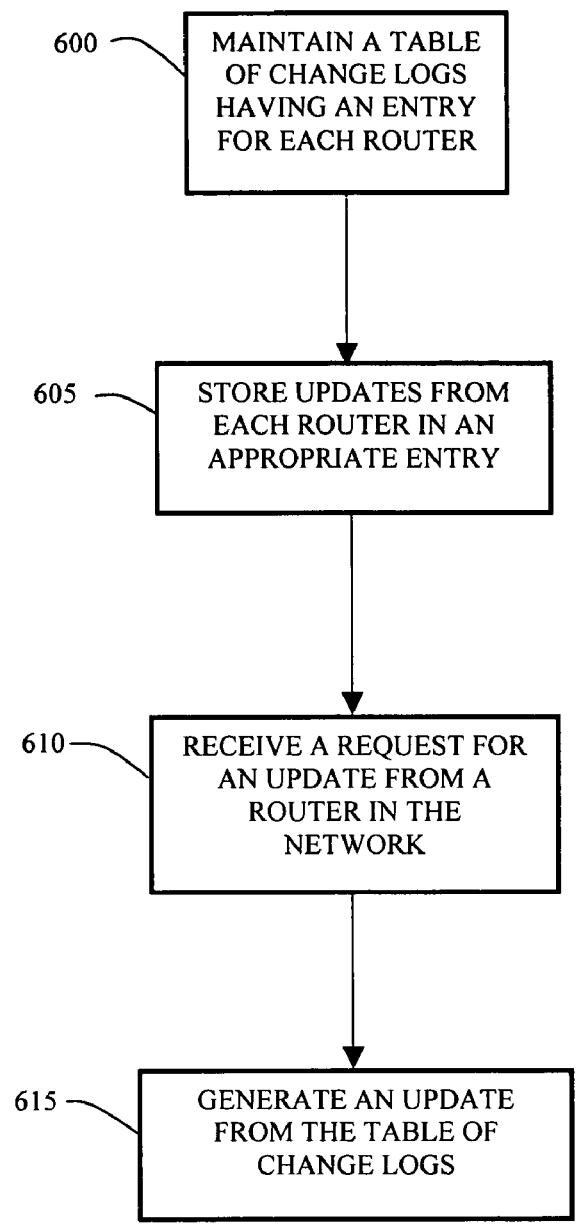
FIG. 10 is a flow chart of the process of the router of FIG. 6 wherein the router maintains a table of change logs.

FIG. 10 is a flow chart of an alternative embodiment of the invention in which the router 115-2 maintains a table of change logs. The table of change logs has an entry for each router 115-2 in the network. The table of change logs enables the router 115-2 to maintain change groups sent as part of updates from other routers in order to respond to requests for those changes. The table of change logs enables a first router, for example router 115-2, to respond efficiently to a request from a second router, for example router 115-1, for changes generated by a third router, for example router 115-3. The change log table is generally set to a maximum number of changes, for example, 1000 changes. The first router, upon receiving a request from the second router, can respond if the changes in its change log table are sequential to the number sent by the second router in its request.

At step 600, the router 115-2 maintains the table of change logs. The table has an entry for each router 115 in the network 110 where the changes sent by that router are stored.

At step 605, the router 115-2 stores updates 240 from each router 115 in the network 110 in an appropriate entry in the table. Whenever the router 115-2 receives an update 240 from one of the other routers 115-1, 115-3, 115-4, the router 115-2 reconciles the current version vector 235 as described above, updates the database 225, and then further includes the changes into the change log table in the entry for the router 115 that sent the update 240.

At step 610, the router 115-2 receives a request for an update 240 from another router, for example router 115-1, in the network. The request for an update 240 can be specific, for example, "send change events 15-32 of router 115-3."

At step 615, the router 115-2 generates an update 240 from the table of change logs in response to the request from the other router 115-1. Since the router 115-2 maintains the changes from each of the routers 115, the router 115-2 is able to generate a response to the request received in step 610.

The two methods that follow are router failure recovery methods. These two methods enable the routers 115 to recover the database 225 after the router 115 fails and recovers.

Figure 11:
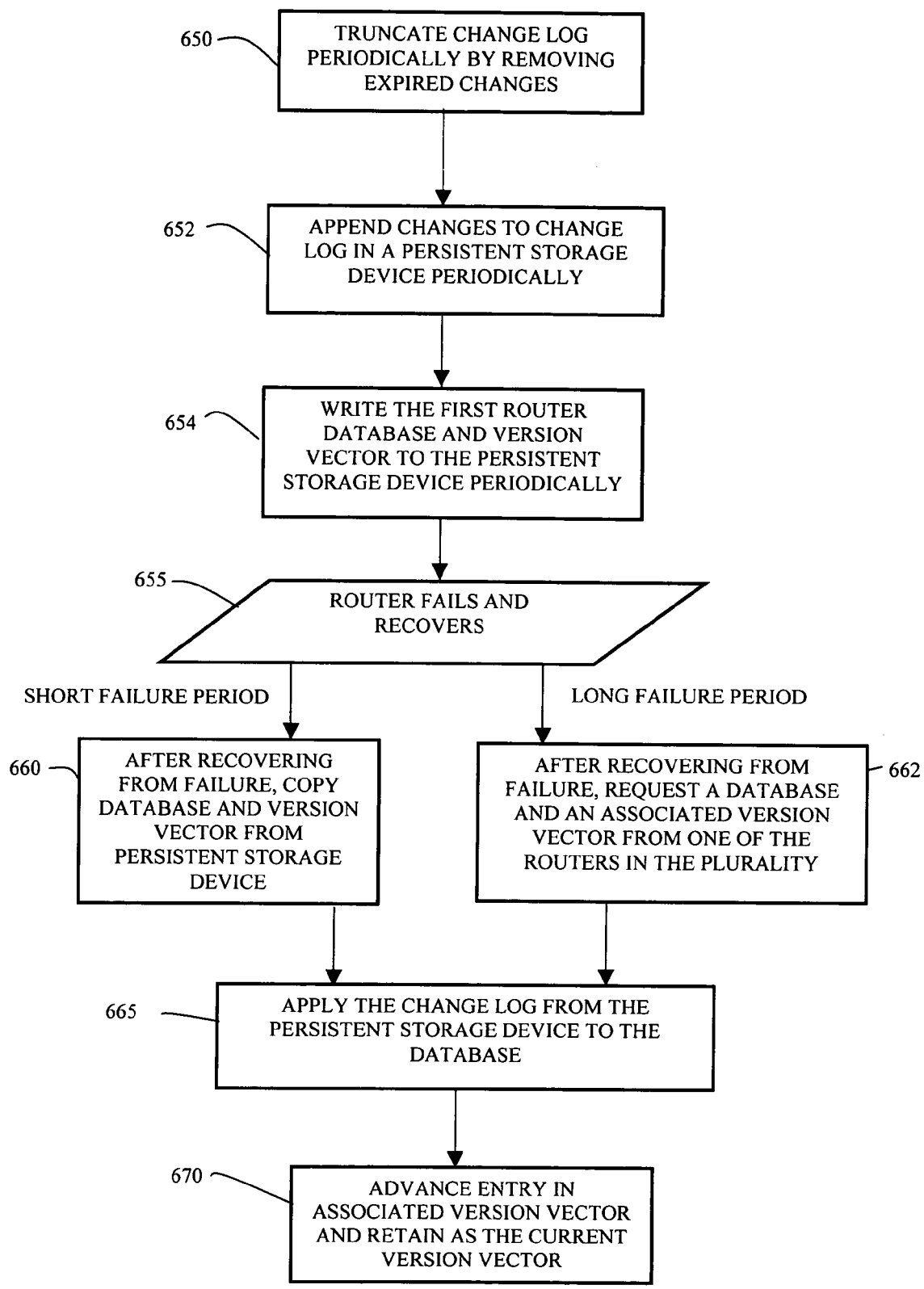
FIG. 11 is a flow chart of a first failure recovery method of the router of FIG. 6.

FIG. 11 is a flow chart of a router, for example router 115-2 of the present invention where the router 115-2 has a persistent storage device 220 to use in maintaining the database 225 through router failure and recovery.

At step 650, the router 115-2 periodically truncates its change log by removing expired changes. The period for truncating the change log is, for example, every five minutes. Generally, the router 115-2 truncates entries whose expiration time is less than current time—expiration duration—epsilon to account for clock skew among routers in the network. Epsilon is for example in the range of 10 msec to 1 minute.

At step 652, the router 115-2 periodically appends recent changes to its change log in the persistent storage device. The period for writing the change log to the persistent storage device is for example every 100 changes. Alternatively, the period could be once every 30 seconds. In a further alternative embodiment, the router 115-2 appends changes to the change log in the persistent storage device every 100 changes, for example, or once every 30 seconds, whichever event occurs first. The router 115-2 appends the changes to the change log in the persistent storage device before the router 115-2 sends changes to other routers in the network. This ensures that the router 115-2 has at least as much information about its own changes after failure and recovery than any other router in the network.

At step 654, the router 115-2 periodically writes a copy of its database 225 and current version vector to the persistent storage device 220. For efficient operation, the router 115-2 writes the database 225 to the persistent storage device 220 less frequently than the router 115-2 writes the change log to the persistent storage device 220. For example, the router 115-2 writes to the database every 10 minutes.

At step 655, the router 115-2 fails and recovers. If the period of failure is long, for example, greater than 5 minutes, much of the information that the router 115-2 stored in the database is expired and so the router 115-2 needs to request information from another of the routers in the network. If the period of failure is short, for example, less than five minutes, most the information that the router 115-2 stored in the database is still valid. In this case, the router 115-2 can use its own stored database and version vector for recovery.

At step 660, the router 115-2, having recovered from a short failure period, takes the database and version vector stored in the persistent storage device. Recovery from the persistent storage device is typically faster than recovery using data from another router because the time to move data across the network is slower. After recovering the database and version vector, the router 115-2 proceeds to step 665.

At step 662, the router 115-2, having recovered from a long failure period, requests a database and an associated version vector from one of the other routers 115-1, 115-3, 115-4 in the network 110. After receiving the database and version vector from some other router, the router 115-2 proceeds to step 665.

At step 665, the router 115-2 reconciles the recovered database with the change log stored in the persistent storage device.

At step 670, the router 115-2 updates its own entry in the recovered version vector and retains the recovered version vector as the current version vector 235.

Figure 12:
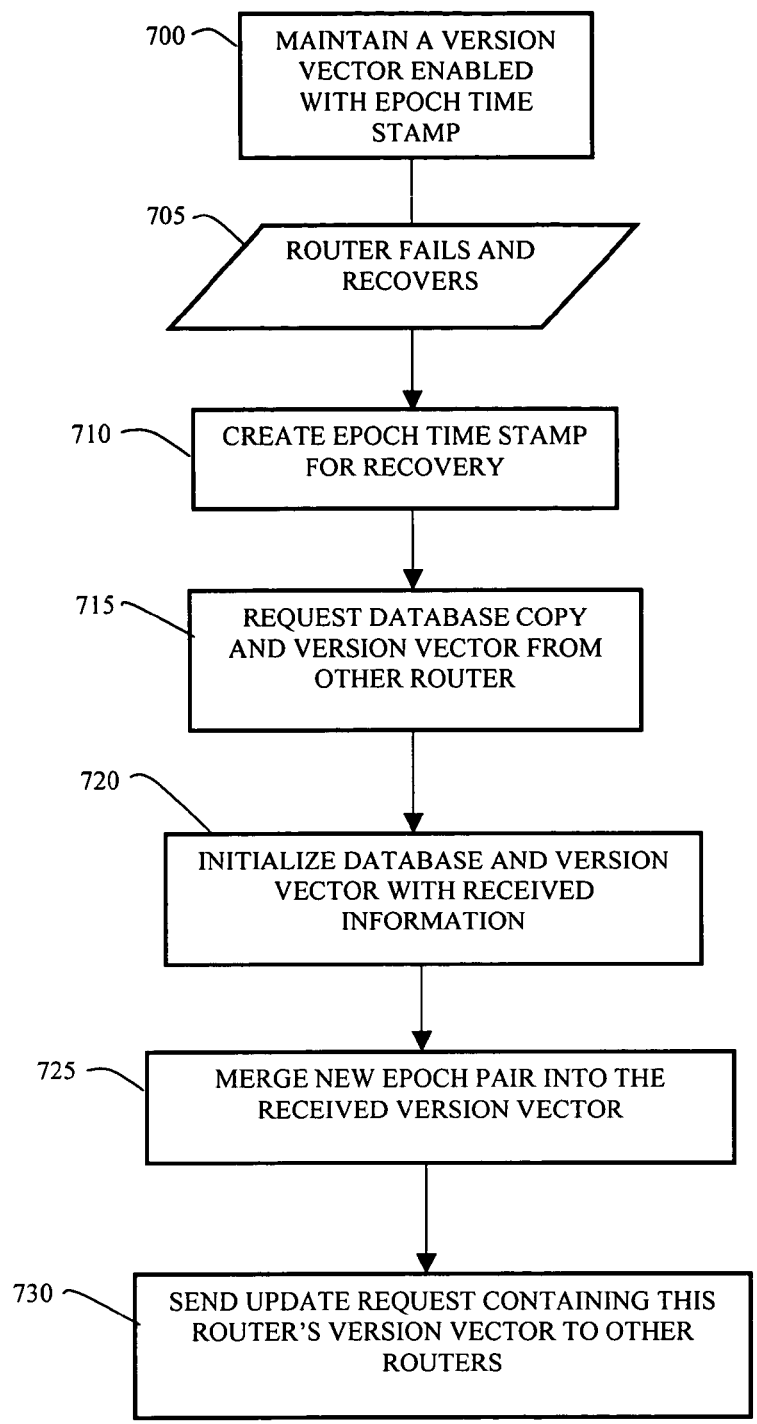
FIG. 12 is a flow chart of a second failure recovery method of the router of FIG. 6.

FIG. 12 is a flow chart of a router, such as router 115-2 of the present invention using a version vector 235 enabled with an epoch time stamp to maintain the database 225 through failure and recovery.

At step 700, the router 115-2 maintains a current version vector 235 enabled with an epoch time stamp. Each entry in the current version vector 235 contains a sequence of pairs. Each pair has an epoch number and an event number. The epoch number marks a recovery from router failure. The router 115-2 updates the current version vector according to epoch. When the router 115-2 receives an update version vector from another router in the network, the router 115-2 merges each sequence in the update version vector with the corresponding sequence in its current version vector by retaining any pair from an epoch present in only one of the version vectors. If both sequences have entries from the same epoch, the router 115-2 retains the pair with the larger event number. The router 115-2 removes pairs from the version vector when the epoch is no longer current. This happens when the next epoch started more than the TTL duration ago plus a small additional time value to account for the clock skew. A version vector entry typically contains only one pair. Version vector entries with more than one pair exist for the TTL duration after a new current epoch starts.

For example, a version vector at router 115-1 assuming a TTL duration of 30 minutes and the clock of router 115-1 is at 12:00 is the following:

<[<10:00, 17>], [<11:31, 6> <11:47, 3>], [<9:00, 36>]>.

No date is used in the above example for convenience. Typically, however, an epoch time stamp includes a date. The first entry in the example version vector is the entry for the router 115-1 itself. Router 115-1 last recovered from a failure at 10 o'clock. The third entry is the router 115-1's entry for router 115-3 indicating that the router 115-3 last recovered from a failure at 9 o'clock. The second entry is the router 115-1's entry for router 115-2. Router 115-2 has recovered twice from failures, once at 11:31 and again at 11:47. Both entries are present because the failures and recoveries occurred within the 30 minute duration period used in this example. Therefore, the earlier epoch of router 115-2 may have a non-expired event. The entry for router 115-2 indicates that router 115-1 knows of six changes produced by router 115-2 in the epoch 11:31 and three changes produced by router 115-2 in the epoch 11:47. To continue the example, the router 115-1 advances and reaches 12:17. At this point, router 115-1 removes the earlier pair from the entry of router 115-2 which results in the following version vector at router 115-1:

<[<10:00, 17>], [<11:47, 3>], [<9:00, 36>]>.

The earlier pair in the entry for router 115-2 can be deleted because the TTL duration has passed and all events for that epoch are expired.

At step 705, the router 115-2 fails and recovers.

At step 710, the router 115-2 creates an epoch time stamp by reading its clock. The router 115-2 begins its new entry in the current version vector with event number zero. For example, if router 115-2 recovered 1t 12 o'clock, the entry is <12:00, 0>.

At step 715, the router 115-2 requests a database and version vector from another router.

At step 720, the router 115-2 then initializes its own database and version vector with this information.

At step 725, the router 115-2 merges its new epoch pair into the version vector. For example, router 115-2 requests the database and version vector of the router 115-1 and the router 115-1 sends the following version vector:

<[<10:00, 17>], [<11:31, 6> <11:47, 3>], [<9:00,36>]>.

Router 115-2 initializes its version vector to the received information and then merges its new epoch pair into its version vector to obtain:

<[<10:00, 17>], [<11:31, 6> <11:47, 3> <12:00, 0>], [<9:00,36>]>.

At step 730, the router 115-2 sends update requests containing its current version vector to other routers, such as router 115-3. Router 115-2 makes this request because after receiving the database and version vector from router 115-2, the router 15-2 may still not know all of its events that occurred before it failed. Accordingly, the router 115-2 requests data from additional routers in the network to effect a more complete recovery. The router receiving the request message can determine from the version vector in the message whether the sender, router 115-2, is missing some of its own changes. If changes are missing, the responder sends back its version vector, and either its entire database, or in a change log table-enabled system, the responder can sends only the requestor's events. In the case of receiving an entire database, the router 115-2 must merge the new database with one it already has. The router 115-2 does this by treating the new database as a list of changes, typically a very large list of changes.

The advantage of the epoch time stamp recover method is that the system requires no persistent storage device.

Figure 13:
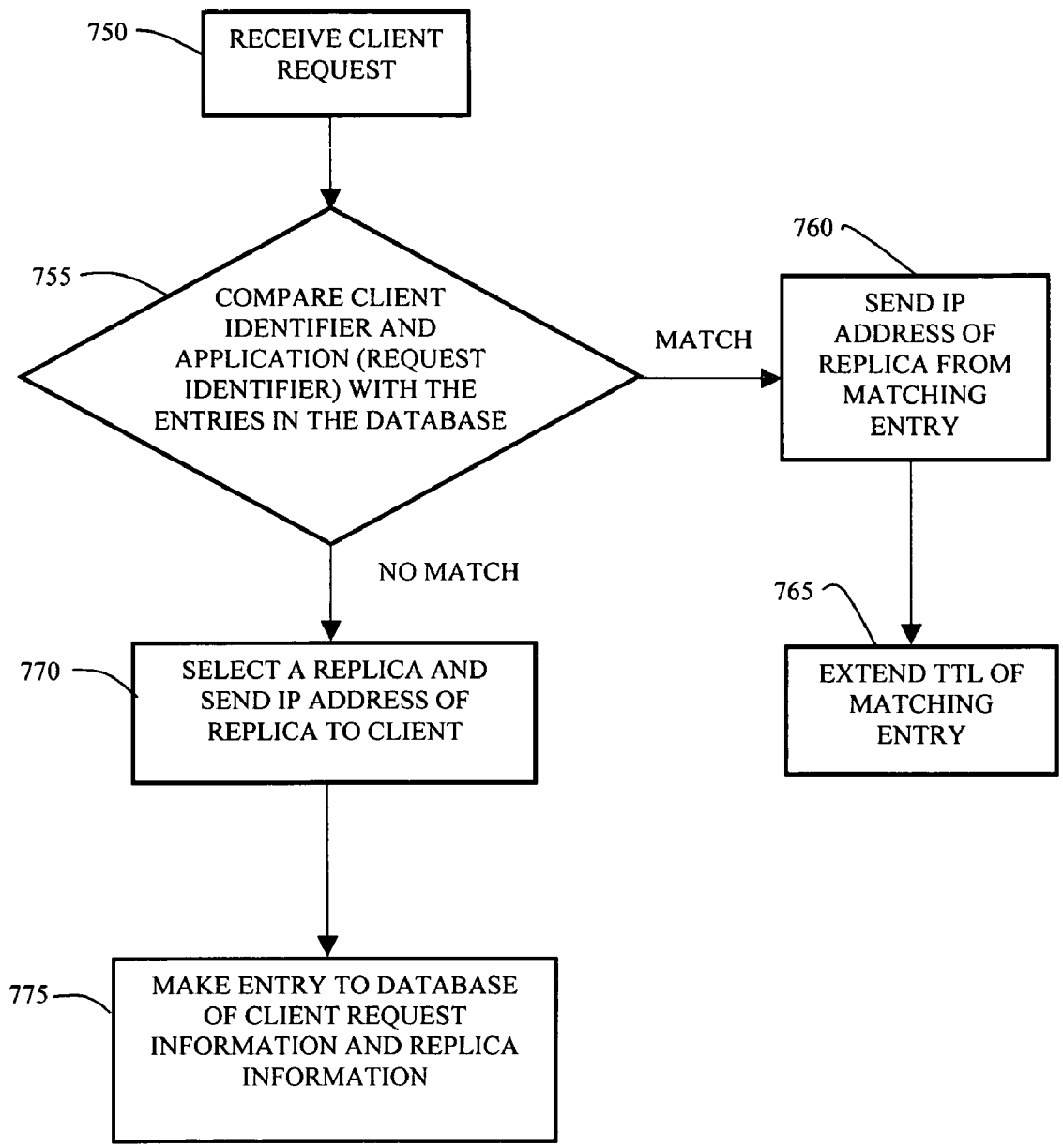
FIG. 13 is a flow chart of the operation of the router of FIG. 6 in responding to a client request for an application running in the network.

FIG. 13 is a flow chart of the process of one of the routers, such as router 115-2 responding to a client request 135 for access to an application running in the network 110.

At step 750, the router 115-2 receives the client request 135 for an application having several replicas running in the network 110. The client request 135 includes a client identifier 310 such as the dproxy address 125 of dproxy 120 and an application identifier 305 such as the domain name of an application running in the network 110. The client identifier 310 and the application identifier 305 are together referred to as the request identifier. The request identifier is what the router 115-2 uses to find a match in the database 225 for the client request 135.

At step 755, the router 115-2 compares the client identifier 310 and application identifier 305 with the entries 300 in the sticky database 225. If the router 115-2 finds an entry having a matching client identifier 310 and application identifier 305, the router 115-2 proceeds to step 760. If the router 115-2 does not find an entry having a matching client identifier 310 and application identifier 305, the router 115-2 proceeds to step 770.

At step 760, the router 115-2 has found an entry 300 in the sticky database 225 having a client identifier 310 and an application identifier 305 matching the data in the client request 135. The router 115-2 sends the IP address of the replica in the matching entry. For example, if the matching entry is a binding to application copy A, the router 115-2 sends IP address A in response to the client request 135.

At step 765, the router 115-2 extends the TTL of the matching entry so that the binding of the client 130 to that particular application replica is further maintained.

At step 770, the router 115-2 has not found an entry 300 in the sticky database 225 having a client identifier 310 and an application identifier 305 matching the data in the client request 135. The router 115-2 selects a replica, such as application copy A, and sends the IP address of the replica, IP address A, to the client 130.

At step 775, the router 115-2 makes a binding 300 between the client, in this example, actually between the dproxy 125 and the replica by adding an entry 300 with the request identifier and the replica IP address to the database 225 and by further including a TTL. The binding 300 is maintained in the database 225 until the TTL expires. During the time that the binding is maintained, further client requests from the same client for the application will receive the IP address of the replica stored in the binding.

The embodiments described above involve DNS routers, however, alternatively non-DNS routers can be used. For example, a DNS router routes to a non-DNS router in a network. When the client makes a request to the non-DNS router, the non-DNS router routes the requests and maintains a sticky database as shown in FIG. 2. In this embodiment, the request identifier has the client IP address rather than a proxy IP address.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a method for providing sticky bindings using version vectors that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured a device for providing sticky bindings using version vectors that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/ or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method, comprising steps of:
providing in a router a database of bindings of client devices to network applications to replicas of a network application, where a client device establishes a session with a replica of a network application, where the session includes a session state, where a binding includes a binding expiration time, and where the router is a first router of a plurality of routers associated with a network in which the network applications run;
maintaining a change log of records entered into the database, where a change log entry has a change event generated by the first router and an event number sequential to an event number of a preceding change event in the change log;
maintaining a current version vector associated with the database and the change log, the current version vector entry for the first router being a most recent event number from the change log, the current version vector entry for each other router being a most recent event number received at the first router from that other router;
receiving an update of change events generated at another router in the plurality;
reconciling the current version vector according to the received update, wherein the step of reconciling the current version vector comprises the steps of:
comparing a least recent event number of the router that generated the update to the event number in the current version vector entry for that router;
if the least recent event number is in series with the event numbers in the database as determined by the current version vector entry for that other router, then entering the most recent event number of the received update into the current version vector entry for the router that generated the update of change events; and
if the least recent event number in the update is not in succession to the event number in the current version vector entry for the router that generated the update of change events, then discarding the received update,
reconciling the database according to the received update such that the client session is maintained; and
providing a consistent DNS binding to a set of related application connection requests from a client device, where the set of related application connection requests request access to a network application having multiple replicas in a distributed network environment, and where the set of requests are associated with a single session established between the client device and a single replica of the network application.

2. The method of claim 1, where the client device is identified by an Internet Protocol (IP) address, where the single replica of the network application is identified by an IP address, and where the network application is identified by a Domain Name System (DNS) name.

3. The method of claim 2, where the client device is associated with a dproxy Internet Protocol address.

4. The method of claim 1 wherein the step of reconciling the database further comprises:
if the update was not discarded in the step of reconciling the current version vector, then for each entry of the received update,
a) determining whether the received entry has expired;
b) if the received entry has expired, then discarding the entry;
c) if the received entry has not expired, then comparing the request identifier of the received entry with the request identifier in the entries in the database;
d) if a matching entry is not found for the received entry, adding the received entry to the database;
e) if a matching entry is found for the received entry, then comparing the application identifier of the received entry with the application identifier of the matching entry;
f) if the application identifiers match, then retaining the entry having a later expiration time in the database; and
g) if the application identifiers do not match, then retaining an entry selected based on a deterministic function applied to a portion of each entry.

5. The method of claim 4 wherein the step of retaining an entry based on a deterministic function comprises the steps of applying a function to the application identifiers; and selecting an entry based on the outcome of the function.

6. The method of claim 4 wherein the step of retaining an entry based on a deterministic function comprises the steps of applying the deterministic function to the request identifier; and selecting an entry based on the outcome of the deterministic function.

7. The method of claim 1 further comprising the step of deleting a binding from the database when the expiration time for the binding has been exceeded.

8. The method of claim 1 further comprising the step of sending a request for an update of change events to another router in the plurality; and
the step of receiving the update further comprises receiving the update in response to the request.

9. The method of claim 1 further comprising the steps of:
periodically generating a first router update of change events; and,
transmitting the first router update of change events to at least one other router in the plurality.

10. The method of claim 1 further comprising the steps of:
affirming that an update has been received from each router of the plurality within a predetermined period for each router;
if an update has not been received from a router within the predetermined period for that router, requesting an update of change events from that router; and
if an update is received in response to that request, reconciling the current version vector according to the received update; and
reconciling the database according to the received update.

11. The method of claim 1 wherein the step of reconciling the database further comprises the steps of: determining from the received update whether the database has a complete record of changes based on the current version vector; if the database does not have a complete record of changes, requesting a replacement database from a router of the plurality of routers.

12. The method of claim 1 further comprising the step of transmitting a copy of the database and the current version vector to another router of the plurality of routers in response to a request from the other router.

13. The method of claim 1 wherein the computerized device fails temporarily and recovers, the method further comprising the steps of:
writing the first router change log to a persistent storage device;
sending an update of change events written to the change log in the persistent storage device to other routers in the network;
after recovering from failure, requesting a database and an associated version vector from one of the routers in the plurality;
retaining the received database and associated version vector;
reconciling the received database with the change log from the persistent storage device; and
updating the received version vector.

14. The method of claim 1 wherein the received update includes a version vector and the method of maintaining a current version vector further comprises the step of maintaining the current version vector in a version vector table including past version vectors.

15. The method of claim 14 further comprising the steps of:
determining from the version vector table whether the database is current based on the version vector table; and
if the database is not current, then requesting missed change events from a second router in the network.

16. The method of claim 15 wherein each router caches updates received from other routers in the plurality, the method further comprising the step of:
if the router that generated the received update does not respond to the request for missed change events, requesting the missed change events from a second router of the plurality and reconciling the change events into the database and current version vector.

17. The method of claim 1 wherein the computerized device fails temporarily and recovers, wherein the step of maintaining a current version vector further comprises the steps of:
creating an epoch timestamp from a clock of the computerized device to mark a recovery period;
entering a value pair to the current version vector for the first router, the value pair being an event number and the epoch timestamp; and
the method further comprising the step of after recovery, requesting a database copy and associated version vector from one of the other routers in the plurality.

18. The method of claim 17 further comprising the steps of:
determining whether a pre-selected time period has passed; and
deleting value pairs before a most recent value pair from the current version vector having timestamps created before the pre-selected time period.

19. A system to maintain a client session between a client device and a replica of a network application running in a network having a plurality of routers, comprising:
- a network interface to receive a request from a client to access the network application
  wherein the network interface is configured to receive an update of change events for the database from another router in the plurality of routers in the network; and
- the controller is further configured to reconcile the database according to the received update and to update the current version vector in response to reconciling the database,
  wherein to reconcile of reconciling the current version vector comprises the steps of:
  - comparing a least recent event number of the router that generated the update to the event number in the current version vector entry for that router;
  - if the least recent event number is in series with the event numbers in the database as determined by the current version vector entry for that other router, then entering the most recent event number of the received update into the current version vector entry for the router that generated the update of change events; and
  - if the least recent event number in the update is not in succession to the event number in the current version vector entry for the router that generated the update of change events, then discarding the received update;
- a storage device to store a database of bindings, where a binding relates the client device to the network application to a replica of the network application, where the client device is identified by an IP address, where the replica is identified by an IP address, and where the network application is identified by a DNS name, and where a binding includes a binding expiration time, the storage device to further store a change log and a current version vector associated with the change log where the change log includes records added to the database by the system and the current version vector has an entry for each router in the network, each entry storing a version vector of a particular router; and
- a controller coupled to the interface and the storage device, the controller configured to route the request, if the controller finds a binding matching the request, the controller to route the request to a replica of the network application according to the binding and to reset the binding expiration time in the binding, if the controller does not find a binding matching the request, the controller to add a new record to the database of bindings.

20. The system of claim 19 wherein the controller is configured to transmit periodically, to at least one of the other routers in the plurality, an update of change events and the current version vector.

* * * * *

UNITED STATES PATENT AND TRADEMARK OFFICE
CERTIFICATE OF CORRECTION

PATENT NO. : 7,610,387 B1  Page 1 of 1
APPLICATION NO. : 10/706360
DATED : October 27, 2009
INVENTOR(S) : Liskov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1295 days.

Signed and Sealed this

Twelfth Day of October, 2010

David J. Kappos
*Director of the United States Patent and Trademark Office*